(12) United States Patent
Fickert et al.

(10) Patent No.: US 10,900,367 B2
(45) Date of Patent: Jan. 26, 2021

(54) SEALING UNIT FOR TURBOCHARGER

(71) Applicant: BorgWarner Inc., Auburn Hills, MI (US)

(72) Inventors: Marc Fickert, Kaiserslautern (DE); Sebastian Mack, Bubenheim (DE)

(73) Assignee: BorgWarner Inc., Auburn Hills, MI (US)

( * ) Notice: Subject to any disclaimer, the term of this patent is extended or adjusted under 35 U.S.C. 154(b) by 160 days.

(21) Appl. No.: 16/079,427

(22) PCT Filed: Feb. 16, 2017

(86) PCT No.: PCT/US2017/018076
§ 371 (c)(1),
(2) Date: Aug. 23, 2018

(87) PCT Pub. No.: WO2017/146977
PCT Pub. Date: Aug. 31, 2017

(65) Prior Publication Data
US 2019/0048733 A1 Feb. 14, 2019

(30) Foreign Application Priority Data
Feb. 24, 2016 (DE) .................. 10 2016 202 882

(51) Int. Cl.
*F16J 15/00* (2006.01)
*F01D 11/00* (2006.01)
(Continued)

(52) U.S. Cl.
CPC .......... *F01D 11/003* (2013.01); *F01D 25/186* (2013.01); *F16J 15/441* (2013.01);
(Continued)

(58) Field of Classification Search
CPC .. F01D 11/003; F01D 25/186; F05D 2220/40; F05D 2220/60; F05D 2240/55;
(Continued)

(56) References Cited

U.S. PATENT DOCUMENTS 2,917,329 A * 12/1959 Laser .................. F16C 33/78
277/422
2,948,555 A * 8/1960 Wright ................ F16J 15/441
277/422
(Continued)

FOREIGN PATENT DOCUMENTS

| CN | 204113355 U | 1/2015 |
|---|---|---|
| DE | 102009041741 A1 | 5/2010 |

(Continued)

OTHER PUBLICATIONS

Written Opinion and International Search Report in International Application No. PCT/US2017/018076 dated May 4, 2017.
(Continued)

*Primary Examiner* — Gilbert Y Lee
(74) *Attorney, Agent, or Firm* — Eric L. Doyle; Stephan A. Pendorf; Patent Central LLC

(57) ABSTRACT

A sealing unit for a turbocharger for sealing a transition from a bearing housing into a compressor housing, and a method for producing a sealing unit of this type. The sealing unit includes a sealing bush which is designed for common rotation with a shaft of a turbocharger, a slide ring, and first and second groove rings. The first and second groove rings are designed for common rotation with the sealing bush and are arranged on the sealing bush. The slide ring is arranged between the first and second groove rings in the axial
(Continued)

direction so that radially extending sealing gaps are formed on both sides of the slide ring between the slide ring and the respective groove ring.

20 Claims, 3 Drawing Sheets

(51) Int. Cl.
*F16J 15/44* (2006.01)
*F01D 25/18* (2006.01)

(52) U.S. Cl.
CPC ...... *F05D 2220/40* (2013.01); *F05D 2230/41* (2013.01); *F05D 2230/60* (2013.01); *F05D 2240/55* (2013.01); *F05D 2240/58* (2013.01); *F05D 2240/70* (2013.01)

(58) Field of Classification Search
CPC ... F05D 2240/58; F05D 2240/70; F16J 15/16; F16J 15/34; F16J 15/44; F16J 15/441; F16J 15/442
See application file for complete search history.

(56) References Cited

U.S. PATENT DOCUMENTS

| 4,323,255 A * | 4/1982 | Wiese ................. F16J 15/3404 |
| | | 277/362 |
| 4,489,951 A * | 12/1984 | Kataoka ............... F16J 15/3468 |
| | | 277/362 |
| 5,407,235 A * | 4/1995 | Rechenberg .......... F16C 11/045 |
| | | 277/422 |
| 9,890,650 B2 * | 2/2018 | Von Berg ................. F16J 15/24 |
| 10,494,942 B2 * | 12/2019 | Albers ................. F01D 11/005 |
| 2004/0228553 A1 | 11/2004 | Simon et al. |

FOREIGN PATENT DOCUMENTS

| DE | 102013200659 A1 | 7/2014 |
| EP | 1479929 A2 | 11/2004 |
| EP | 2060804 A1 | 5/2009 |
| EP | 26169186 A2 | 3/2010 |

OTHER PUBLICATIONS

Chinese Office Action (with English language translation) dated Jun. 9, 2020, in Chinese Application No. 201780012951.2.

\* cited by examiner

SEALING UNIT FOR TURBOCHARGER

FIELD OF THE INVENTION

The present invention relates to a sealing unit for a turbocharger and a turbocharger with a corresponding sealing unit, and also a method for producing a sealing unit.

BACKGROUND INFORMATION

Increasingly more vehicles of the more recent generation are equipped with turbochargers. In order to achieve the target demands and the legal requirements, it is imperative to promote development in the entire drive train and also to optimize the individual components as well as the system as a whole with respect to their reliability and efficiency.

Known turbochargers have a turbine housing, a compressor housing, and a bearing housing which is conventionally connected to the turbine housing on the turbine side and to the compressor housing on the compressor side. A shaft/rotor which supports the turbine wheel and the compressor wheel is mounted in the bearing housing. Radial bearings and axial bearings are generally arranged in the bearing housing interior, which is separated from the interior of the compressor housing by an end wall, for example, in the form of a bearing housing cover. There are different solutions for sealing the interior of the compressor housing against the bearing housing interior, in order to prevent, for example, the transfer of oil, which is required for the bearings in the bearing housing, and also to prevent the transfer of gases.

A sealing bush presents one known solution, wherein one or more sealing rings in the form of piston rings are arranged between the sealing bush and the end wall, guided in a groove in the sealing bush. The disadvantage in this type of design is that the radial sealing gap between the piston rings and the sealing bush rotating with the shaft is short, and additionally the gap width must be selected as relatively large in order to be able to tolerate movements of the shaft (axial, radial, and tilting in particular) and to prevent seizing. Furthermore, a relatively high variation may occur in the gap widths due to the manufacturing tolerances for piston rings and grooves, such that the actual gap width may lie in a large range. The slot or the open region of the piston rings may also have a disadvantageous effect, (it is required to achieve a spring effect), as the sealing effect is reduced in this region.

An alternative solution is described in EP 2 060 804 A1, in which a sealing bush forms a radial sealing region with a thrust ring and a slide ring. In the configuration described, the slide ring is pressed against the thrust ring by a spring such that the slide ring is in contact with the thrust ring in the stationary state and a gas-lubricated sealing arrangement with sealing gap occurs only due to the rotation of the shaft. The disadvantage here is the expensive structure and the pretensioned assembly as well as friction losses between the slide ring and the thrust ring at the start of operations, which may also lead to increased wear.

The aim of the present invention is accordingly to provide an improved sealing unit for a turbocharger which remedies the disadvantages described above with a simple structure and cost-efficient producibility.

BRIEF SUMMARY OF THE INVENTION

The present invention relates to a sealing unit for a turbocharger according to claim 1, a turbocharger according to claim 8, and a method for producing a sealing unit according to claim 9 and claim 10.

According to the invention, the sealing unit for a turbocharger for sealing a transition from a bearing housing into a compressor housing has a sealing bush, a slide ring, and first and second groove rings. The sealing bush is designed for common rotation with a shaft of the turbocharger. The two groove rings are designed for common rotation with the sealing bush and are arranged on the sealing bush. The slide ring is arranged between the two groove rings in the axial direction so that radially extending sealing gaps are formed on both sides of the slide ring between the slide ring and the respective groove ring.

In comparison to known solutions using piston rings, the sealing unit according to the invention enables the provision of longer radial sealing gaps. In addition, a low width of the sealing gaps may be implemented as the clearance between the slide ring and the groove rings, and thus the sealing gap, may be exactly adjusted, and is not dependent on multiple tolerances, for example, manufacturing tolerances for the piston rings and for the grooves in which the piston rings are arranged. These two advantages positively affect gas/oil leakage, which means there is a lower gas/oil leakage from the bearing housing into the compressor housing. The targeted adjustability has the additional advantage that the width of the sealing gaps has almost no variation in mass production, in contrast to known solutions, in which the sealing gaps may be delivered with large variabilities due to the interacting tolerances. The targeted and repeatable adjustability of sealing gap width without variation also enables a low level of leakage uncertainty and thus a better predictability.

In configurations, an outer diameter of the sealing bush may be smaller in the area of the slide ring than an inner diameter of the slide ring such that a gap is formed between the sealing bush and the slide ring. Due to the sealing gaps in the radial direction and the axial gap between the slide ring and the sealing bush, the slide ring may compensate for the movement of the shaft (with the sealing bush arranged rotationally fixed thereon).

In configurations, which may be combined with all previously described configurations, recesses may be provided in the radial side walls of the groove rings that face the slide ring. The recesses may act in a gas transporting way, by which means a gas cushion is formed in the sealing gaps during operation of the turbocharger. In addition or alternatively, recesses may be provided in the radial side walls of the slide ring, wherein the recesses likewise act in a gas transporting way, so that a gas cushion is formed in the sealing gaps during operation of the turbocharger. The formation of the gas cushions has that advantage that an air film is always present between the groove rings and the slide ring during operation. The air film reduces potential friction between the components and also wear on the slide ring and groove rings. The recesses additionally generate a pump effect which conveys present oil back in the direction of the bearing housing. This effect leads, in turn, to lower oil leakage.

In configurations, which may be combined with all previously described configurations, the first and second groove ring may each be provided as a separate component. In particular, the two groove rings may be designed in order to be shrunk onto the sealing bush or glued or welded to the sealing bush. The design of the sealing unit according to the invention is optimized with the individual components of the slide ring and first and second groove ring in order to be able to easily process the surfaces of the components before the assembly of the sealing unit. Thus, in particular, a very precise processing of the surfaces, for example, lapping, flat honing, or fine surface grinding of the radial surfaces of the slide ring and/or of the two groove rings may be provided. By this means, extremely exact dimensions may be manufactured and very smooth surfaces may be produced. This effects the effectiveness of the sealing unit and leads, in turn, to lower gas/oil leakage. Alternatively to two separate groove rings, it may be provided that the first groove ring is designed integrally with the sealing bush and the second groove ring is a separate component. The second groove ring may thereby be designed to be shrunk onto the sealing bush or glued or welded to the sealing bush.

In configurations, which may be combined with all previously described configurations, a sealing ring may be additionally provided, wherein the sealing ring is arranged radially outside of the slide ring and surrounds the same. The sealing ring may be designed to form a second seal between the sealing unit and an end wall for a bearing housing of the turbocharger. As already mentioned above, the relatively freely moving slide ring may compensate for the axial and radial movements of the shaft/sealing bush. Since the sealing ring has a certain flexibility, the sealing unit with the sealing ring may better compensate for a tilting of the shaft: if the shaft tilts, then the sealing bush as well as the groove rings arranged thereon are tilted. This likewise leads to a tilting of the slide ring, wherein ultimately the flexibility of the sealing ring compensates for the tilt movement (the sealing ring is compressed on one side and slackened on the other side. A reduction of the sealing gap or even seizing is thereby counteracted. Due to the "floating" arrangement of the slide ring between the groove rings in combination with the sealing ring, the necessity of pretensioning via a spring element is omitted, by which means a component is saved and also the assembly is facilitated. The sealing ring may in particular have an X-shaped cross section. For example, an X-ring (e.g. a Quadring® from Quadion Corporation) may be provided. A sealing ring with an X-shaped cross section offers a better compressibility due to the lower stiffness in the radial direction in comparison to conventional O-rings.

In configurations, which may be combined with all previously described configurations, at least one securing means may additionally be provided, wherein the securing means are designed to prevent the slide ring from twisting. The securing means may be arranged, for example, annularly around the slide ring or along the periphery of the slide ring. The securing means may be configured either as an integral component of the slide ring or as a separate component. Due to the securing means, it is guaranteed during operation that only the groove rings and the sealing bush rotate together with the shaft/rotor whereas the slide ring remains stationary. The securing means may, for example, be positively, non-positively, or integrally connected on the radially inner side to the slide ring and may be designed in order to be positively, non-positively, or integrally connected on the radially outer side to an end wall (of the bearing housing). In particular, the securing means may engage radially inwardly into a groove in the slide ring and may be designed in order to be connected radially outwardly to the end wall in a rotationally fixed way. It may be provided that the securing means are configured with an L-shaped cross section and an axially extending leg of the securing means is arranged between the slide ring and the sealing ring. In particular, it may be provided that the slide ring is glued to the securing means in order to prevent twisting. For this purpose, a groove may be provided in the slide ring on the radially outer periphery, wherein the groove functions to accommodate an adhesive for gluing the slide ring to the securing means.

In configurations, which may be combined with all previously described configurations, the radial side walls of the slide ring may be lapped, flat honed, or fine surface ground, and/or the radial side walls of the groove rings which face the slide ring may be lapped, flat honed, or fine surface ground. In addition, it may be provided that the groove rings have a chamfer on the radially outer end which functions to facilitate assembly.

In configurations, which may be combined with all previously described configurations, the sealing gaps may have a length in the radial direction in the range from 0.1 mm to 15 mm, in particular from 0.5 mm to 10 mm, preferably from 1 mm to 5 mm. During operation, the sealing gaps may have a gap width in the range from 1 µm to 30 µm, in particular from 2 µm to 20, preferably from 5 µm to 10 µm.

In configurations, which may be combined with all previously described configurations, the sealing gaps may be adjustable during the assembly process, for example, the clearance between the groove rings for the slide ring.

The invention additionally comprises a turbocharger for an internal combustion engine with a sealing unit according to any one of the preceding configurations.

The invention additionally comprises two methods for producing a sealing unit for a turbocharger. The first method comprises the steps: providing a sealing bush; providing one first and one second groove ring; arranging the first groove ring on the sealing bush; arranging a slide ring contacting on the first groove ring; arranging a spacing jig to adjust sealing gaps between the slide ring and the groove rings; arranging the second groove ring; removing the spacing jig.

The second method comprises the following steps: providing a sealing bush with an integral first groove ring; providing a second groove ring; arranging a slide ring contacting on the first groove ring; arranging a spacing jig to adjust sealing gaps between the slide ring and the groove rings; arranging the second groove ring; removing the spacing jig.

The methods according to the invention have the advantage that the width of the radial sealing gap, which is present between the slide ring and the two groove rings during operation, may be adjusted in a targeted way via the spacing jig. In addition, a very exact repeatability of the manufacturing is possible due to the method. The reproducibility of the precise assembly and adjusting of the width of the sealing gaps is, in particular, not dependent on an interplay of multiple manufacturing tolerances, for example, the piston ring and the groove for the piston ring. This means, there is virtually no manufacturing-caused variation of the width. The width of the sealing gap may, if desired, also be changed in a targeted way in that another spacing jig is used.

In configurations of the two methods, the first and the second groove ring or only the second groove ring may be shrunk onto the sealing bush or may be glued or welded to the sealing bush. In addition, the methods may comprise lapping, flat honing, or fine plane grinding of the radial side walls of the slide ring. The radial side walls of the first and/or second groove ring, which face the slide ring, may also be lapped, flat honed, or fine plane ground.

In configurations of the two methods, which may be combined with all previously described configurations, the methods may additionally comprise shaping of recesses into the radial side walls of the first and second groove rings which face the slide ring, and/or shaping of recesses into the radial side walls of the slide ring.

In configurations of the two methods, which may be combined with all previously described configurations, the methods may additionally comprise arranging of at least one securing means around the slide ring or along a periphery of the slide ring to prevent the slide ring from twisting. The securing means may be provided in that they are directly processed into the slide ring and are present as an integral component (e.g. due to machine processing). Alternatively, the securing means may be provided as a separate component. The securing means may be positively, non-positively, or integrally connected to the slide ring and, in particular, a part of the securing means may engage into a groove in the slide ring. The securing means may, for example, be glued to the slide ring.

In configurations of the two methods, which may be combined with all previously described configurations, the spacing jib may comprise a shim. The shim may be arranged between the slide ring and the second groove ring to determine the width of the sealing gap. The shim may have a thickness between 1 µm and 100 µm, in particular between 2 µm and 50 µm, preferably between 5 µm and 30 µm. As already described above, the thickness of the sealing gap may thus be determined and adjusted in a targeted way.

In configurations, which may be combined with all previously described configurations, the methods may additionally comprise the following step: Arranging a sealing ring in an end wall, in particular in a groove, and combining the sealing bush, comprising the groove rings, the slide ring 200, and the optional securing means, and the end wall, comprising the sealing ring, such that the sealing ring is arranged between the slide ring and end wall and forms a second seal.

DETAILED DESCRIPTION OF THE INVENTION

In the following, embodiments of the sealing unit according to the invention for a turbocharger for sealing a transition from a bearing housing into a compressor housing are described by way of the figures. In addition, methods according to the invention for producing the sealing unit will be described in greater detail.

Figure 1:
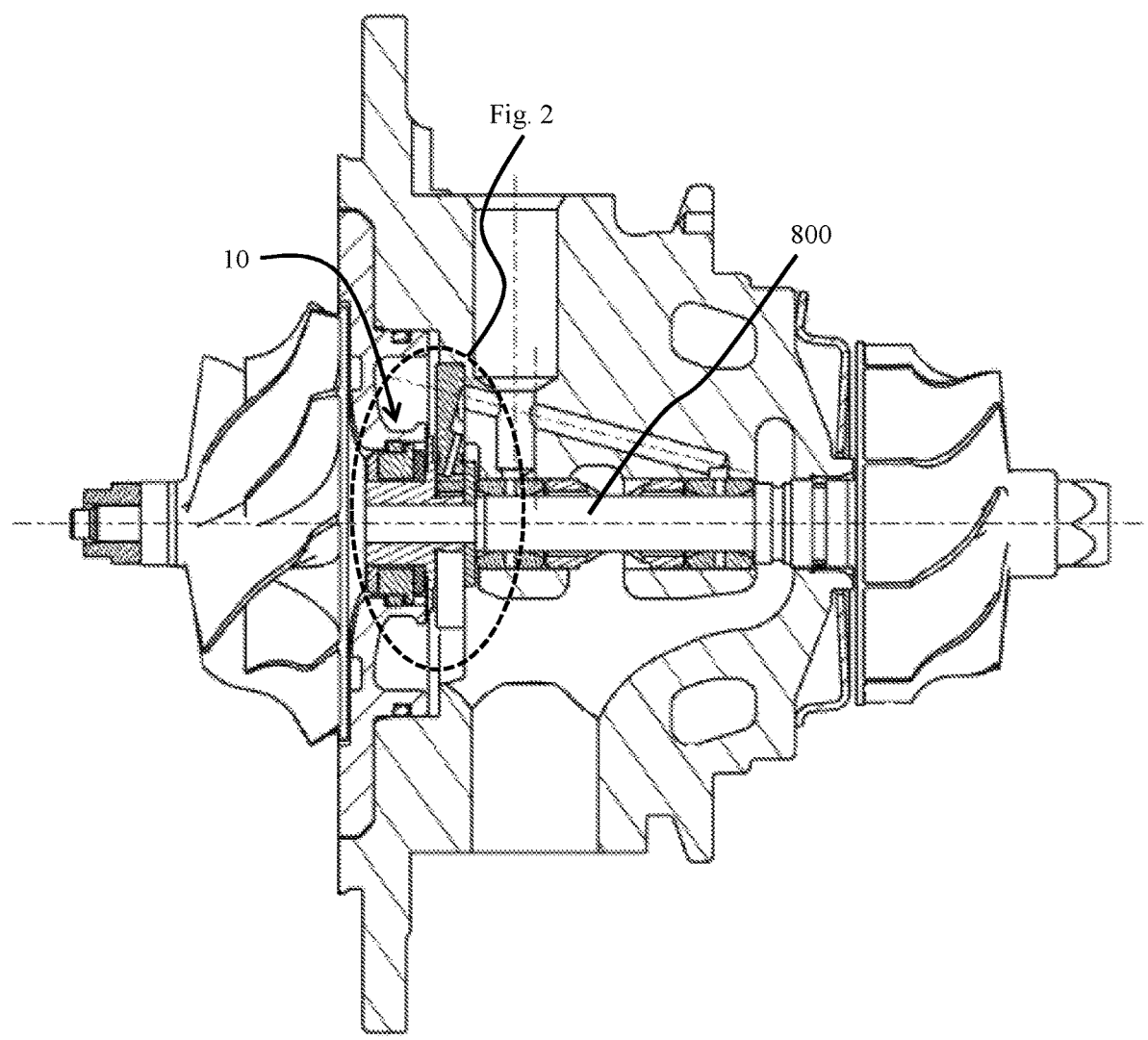
FIG. 1 shows a cutaway view of a first embodiment of the sealing unit according to the invention in the installed state.
Figure 2:
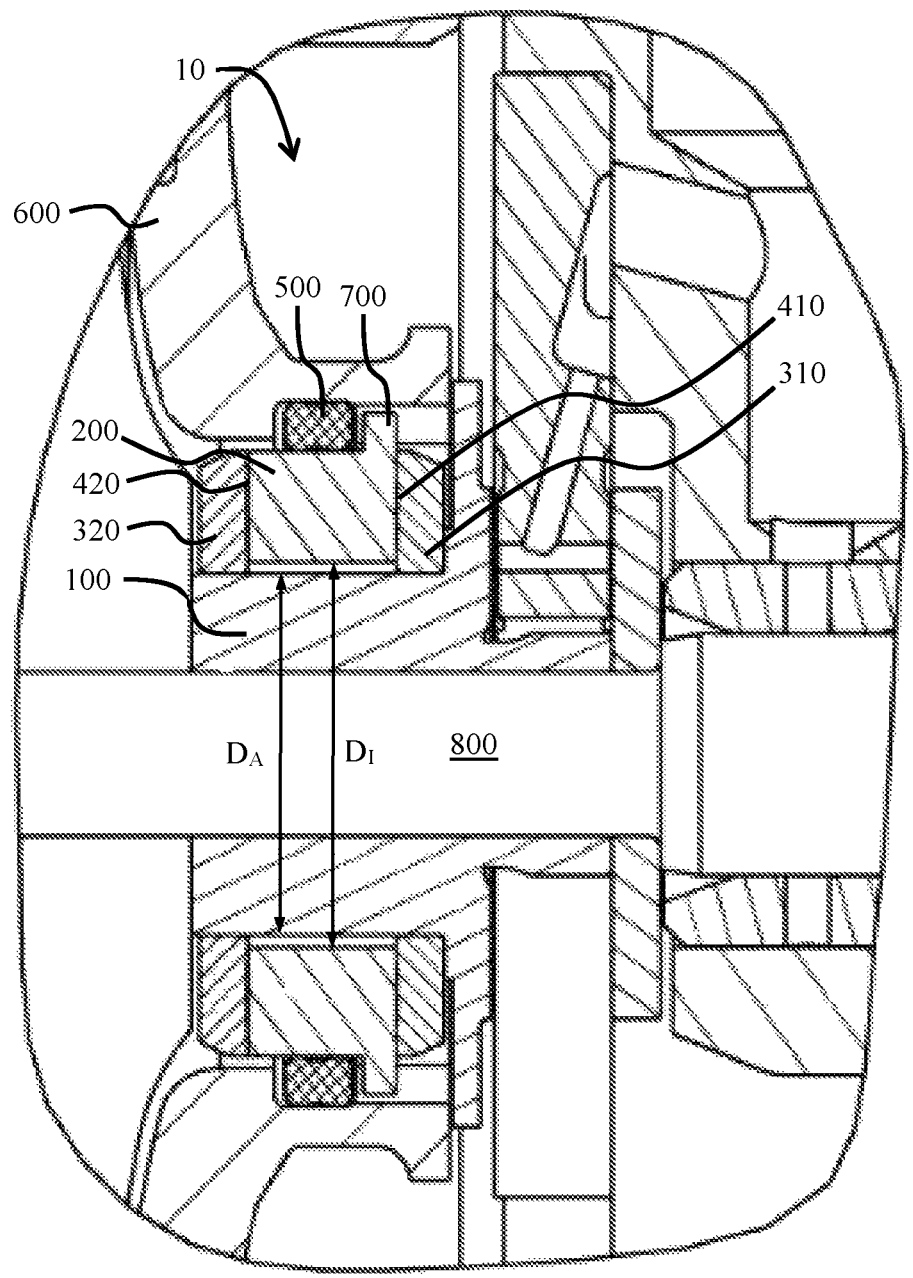
FIG. 2 shows an enlarged view of the sealing unit according to the invention from FIG. 1.
Figure 3:
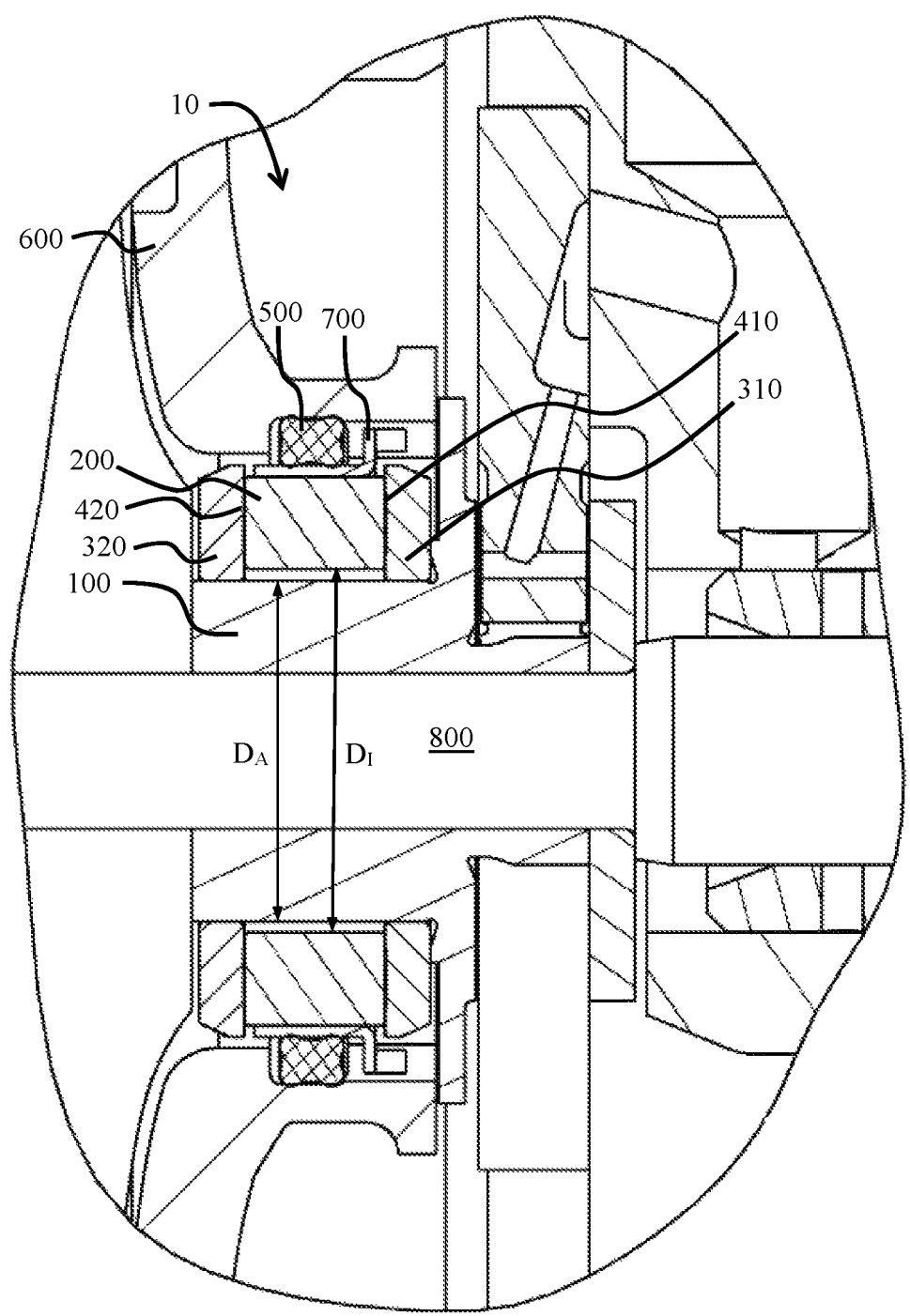
FIG. 3 shows an enlarged view of the sealing unit according to the invention according to a second embodiment.

FIG. 1 shows a first embodiment of the sealing unit 10 according to the invention in the installed state, wherein the compressor housing and the turbine housing of the turbocharger are not shown. FIG. 2 shows an enlarged view of the embodiment of sealing unit 10 from FIG. 1. FIG. 3 shows an enlarged view of a second embodiment of sealing unit 10. Sealing unit 10 has a sealing bush 100, a slide ring 200, and first and second groove rings 310, 320. Slide ring 200 may comprise carbon, for example. Sealing bush 100 is arranged in the installed state on a shaft 800 of the turbocharger for common rotation (see FIG. 1). The two groove rings 310, 320 in turn are arranged on sealing bush 100 for common rotation with the same. As is apparent in FIG. 1, FIG. 2, and FIG. 3, slide ring 200 is arranged between two groove rings 310, 320 in the axial direction such that radially extending air gaps 410, 420 are formed on both sides of slide ring 200 between slide ring 200 and the respective groove ring 310, 320.

The sealing unit according to the invention has multiple advantages. In comparison to known solutions using piston rings, sealing unit 10 enables the provision of longer radial sealing gaps. In addition, a low width of the sealing gaps may be implemented as the clearance between slide ring 200 and groove rings 310, 320, and thus the width of sealing gaps 410, 420, may be exactly adjusted and is not dependent on multiple tolerances, for example, manufacturing tolerances for the piston rings and for the grooves in which the piston rings are arranged. These two advantages in turn positively effect gas/oil leakage, which means there is lower gas/oil leakage from the bearing housing into the compressor housing. The targeted adjustability of the clearance or the sealing gap width has the additional advantage that the width of the sealing gap has almost no variation in mass production, in contrast to known solutions in which the sealing gaps and their widths may be delivered with large variabilities due to the interacting tolerances. The targeted and repeatable adjustability of sealing gap width without variation also enables a low level of leakage uncertainty and thus a better predictability.

As is apparent in FIG. 2 and FIG. 3, the outer diameter $D_A$ of sealing bush 100 is smaller in the area of slide ring 200 than the inner diameter $D_1$ of slide ring 200, so that a gap is formed between sealing bush 100 and slide ring 200. Due to sealing gaps 410, 420 in the radial direction and the axial gap between slide ring 200 and sealing bush 100, slide ring 200 may compensate for the movements of shaft 800 (with sealing bush 100 arranged thereon in a rotationally fixed way).

Recesses, which are provided in the radial side walls of groove rings 310, 320 which face slide ring 200, are not shown in the figures. Radial side walls or radial surfaces (applies for all components of the entire application) are thereby side walls or surfaces which lie in the corresponding planes, which, in the installed state of the sealing unit, extend perpendicular to the axis of rotation of shaft 800. These recesses may, in particular, act in a gas-transporting way, by which means a gas cushion is formed in sealing gaps 410, 420 during operation of the turbocharger. In addition to or alternatively to the recesses in the side walls of groove rings 310, 320, recesses may be provided in the radial side walls of slide ring 200 which have the same effect. The formation of the gas cushion has the advantage that an air film is always present between groove rings 310, 320 and slide ring 200 during operation. The air film reduces potential friction between the components and also wear on slide ring 200 and groove rings 310, 320. The recesses in the side walls additionally generate a pump effect which conveys present oil back in the direction of the bearing housing. This effect leads, in turn, to lower oil leakage.

FIG. 1 through FIG. 3 show embodiments of the sealing unit according to the invention, in which first and second groove rings 310, 320 are each provided as a separate component. In these types of embodiments, the two groove rings 310, 320 may be designed, for example, in order to be shrunk onto sealing bush 100 or glued or welded (e.g. by laser welding) to sealing bush 100. The design of the sealing unit according to the invention is optimized with the individual components of slide ring 200 and first and second groove ring 310, 320 in order to be able to easily process the surfaces of the components before the assembly of the sealing unit. Thus, in particular, a very precise processing of the surfaces, for example, lapping, flat honing, or fine surface grinding of the radial surfaces of slide ring 200 and/or of the two groove rings 310, 320 may be provided. By this means, extremely exact dimensions may be manufactured and very smooth surfaces may be produced. This positively effects the effectiveness of sealing unit 10 and leads, in turn, to lower gas/oil leakage. Alternatively to two separate groove rings shown in the figures, it may be provided that first groove ring 310 is designed integrally with sealing bush 100 and only second groove ring 320 is a separate component. In this case, only second groove ring 320 may be designed to be shrunk onto sealing bush 100 or glued or welded to sealing bush 100.

The sealing unit from FIG. 1 through FIG. 3 additionally comprises a sealing ring 500. Sealing ring 500 is arranged radially outside of slide ring 200 and surrounds the same. Sealing ring 500 thereby forms a second seal between sealing unit 10 and an end wall 600 of the bearing housing of the turbocharger. As already mentioned above, relatively freely moving slide ring 200 may compensate for the axial and radial movements of shaft 800 or of sealing bush 100. Since sealing ring 500 has a certain flexibility, sealing unit 10 according to the invention may also compensate for a tilting of shaft 800. In case shaft 800 tilts, both sealing bush 100 and also groove rings 310, 320 arranged thereon are also tilted. This likewise leads to a tilting of slide ring 200 due to the air cushions formed, wherein ultimately the flexibility of sealing ring 500 compensates for the tilt movement (sealing ring 500 is compressed on one side and slackened on the other side). A reduction of the sealing gap or even seizing is thus counteracted. The "floating" arrangement of slide ring 200 between groove rings 310, 320 in combination with sealing ring 500 also makes the necessity of pretensioning via a spring element superfluous. Thus, an additional component is not only saved, the assembly is also simplified. The sealing ring may in particular have an X-shaped cross section. For example, an X-ring (e.g. a Quadring® from Quadion Corporation) may be provided. A sealing ring with an X-shaped cross section offers a better compressibility due to the lower stiffness in the radial direction in comparison to conventional O-rings.

FIG. 1 through FIG. 3 additionally show securing means 700. Securing means 700 are designed to prevent twisting or rotation of slide ring 200. Securing means 700 may be arranged at a point on the periphery of slide ring 200 or annularly around slide ring 200, or may be provided as multiple securing means at multiple positions along the periphery of slide ring 200: in the embodiments shown in FIG. 1 and FIG. 2, it is an integral component of slide ring 200. This means that slide ring 200 and securing means 700 represent a single component, wherein securing means 700 extend radially outward from slide ring 200. Alternatively, securing means 700 may be configured as a separate component. This type of embodiment is shown in FIG. 3. Due to securing means 700, it is guaranteed that only groove ring 320 and sealing bush 100 rotate together with shaft 800 during operation of the turbocharger, whereas the slide ring remains stationary. If securing means 700 are designed as a separate component, then it may, for example, be positively, non-positively, or integrally connected on the radially inner side to slide ring 200. Securing means 700 are additionally designed to be positively, non-positively, or integrally connected on the radially outer side to end wall 600 (of the bearing housing). In a positive connection, securing means 700 may, for example, engage radially inwardly into a groove in slide ring 200. Securing means 700 are connected radially outwardly to end wall 600 in a rotationally fixed way. In an advantageous embodiment, which is shown in FIG. 3, securing means 700 may be configured with an L-shaped cross section, wherein an axially extending leg of securing means 700 is arranged between slide ring 200 and sealing ring 500. For rotationally fixed connection of securing means 700 to slide ring 200, it may also be provided that slide ring 200 is glued to securing means 700. For this purpose, a groove may be provided in slide ring 200 on the radially outer periphery, wherein the groove functions to accommodate an adhesive for gluing slide ring 200 to securing means 700.

As already mentioned above, the design of sealing unit 10 according to the invention is optimized for a specific processing of the individual components. It is thus possible that the radial side walls of slide ring 200 are lapped, flat honed, or fine plane ground. Alternatively or in addition, it may be provided that the side walls of groove rings 310, 320 that face slide ring 200 are lapped, flat honed, or fine plane ground. The embodiments of the sealing unit shown in FIG. 1 through FIG. 3 additionally show groove rings 310, 320 that have a chamfer on the radial outer end which functions for simpler assembly.

Sealing gaps 410, 420 between groove rings 310, 320 and slide ring 200 may have a length in the radial direction in the range from 0.1 mm to 15 mm, in particular from 0.5 mm to 10 mm, preferably from 1 mm to 5 mm. During operation, sealing gaps 410, 420 may have a gap width in the range from 1 µm to 30 µm, in particular from 2 µm to 20 µm, preferably from 5 µm through 10 µm.

In particular, the sealing unit according to the invention is designed such that sealing gaps 410, 420 or the clearance for slide ring 200 between groove rings 310, 320 are adjustable during the assembly process. Additional details further below in conjunction with the method according to the invention for producing the sealing unit.

The invention additionally comprises two methods for producing embodiments of sealing unit 10 described herein, which are subsequently described in greater detail. The first method alternative functions to produce a sealing unit 10 with two groove rings 310, 320 as separate components, as is shown in FIG. 1 through FIG. 3. Initially, a sealing bush 100 and first and second groove rings 310, 320 are provided. Then follows the arranging of first groove ring 310 on sealing bush 100. Subsequent to the arranging of the first groove ring, slide ring 200 is arranged contacting first groove ring 310. A spacing jig is then arranged to adjust a sealing gap width of radial gaps 410, 420 between slide ring 200 and groove rings 310, 320. Subsequently, second groove ring 320 is arranged on sealing bush 100 spaced apart from slide ring 200, wherein the distance is defined by the spacing jig. Finally, the spacing jig is removed.

Alternatively, the method for producing the sealing bush may also comprise the following steps when one of the groove rings is provided integrally to the sealing bush: Providing of a sealing bush 100 with integral first groove ring 310 and a separate second groove ring 320. Subsequently, slide ring 200 is arranged contacting on first groove ring 310 and the spacing jig is positioned in order to adjust the sealing gaps between slide ring 200 and groove rings 310, 320. Subsequently, the arrangement of second groove ring 320 on sealing bush 100 is carried out, spaced apart from slide ring 200, wherein the distance is defined by the spacing jig. Finally, the spacing jig is removed.

The methods according to the invention have the advantage that the width of radial sealing gaps 410, 420, which are present between slide ring 200 and the two groove rings 310, 320 during operation, may be adjusted in a targeted way using the spacing jig. In addition, a very exact repeatability of the manufacturing is possible due to the method. The reproducibility of the precise assembly and adjusting of the width of the sealing gaps is, in particular, not dependent on an interplay of multiple manufacturing tolerances, for example, the piston ring and the groove for the piston ring. This means, there is virtually no manufacturing-caused variation of the gap widths. The width of the sealing gap may, if desired, also be changed in a targeted way in that another spacing jig is used.

The two groove rings 310, 320 or only second groove ring 320 may be fixed on sealing bush 100 in different ways in the two methods. It may thus be provided that groove ring(s) 310, 320 are glued or welded to sealing bush 100. In particular, it may alternatively be provided that groove ring(s) 310, 320 are shrunk onto the sealing bush. For this purpose, groove ring(s) 310, 320 are heated and/or sealing bush 100 is cooled. By this means, the dimensions of the sealing bush are slightly shrunken and the dimensions of groove rings 310, 320 are slightly enlarged. Temperature ranges for the heating and cooling are generally known and may, for example, lie around 140° C. for the heating and −40° C. for the cooling. If groove ring(s) 310, 320 are shrunken, it may be provided in particular that the spacing jig is first removed after the temperature of sealing unit 10 has normalized.

Both methods may additionally have the following features and method steps. For example, lapping, flat honing, or fine plane grinding of the radial side walls of slide ring 200 may be provided. The radial side walls of first and/or second groove ring 310, 320, which face slide ring 200, may also be lapped, flat honed, or fine plane ground.

In addition, shaping of recesses in the radial side walls of first and second groove rings 310, 320 that face slide ring 200, and/or shaping of recesses in the radial side walls of slide ring 200 may be provided.

The methods may additionally comprise arranging of at least one securing means 700 around slide ring 200 to prevent slide ring 200 from twisting. The securing means may be provided in that they are processed directly into the slide ring (see FIG. 1 and FIG. 2 and are present as an integral component (e.g. by machine processing). Alternatively, securing means 700 may be provided as a separate component (see FIG. 3). Securing means 700 may be positively, non-positively, or integrally connected to slide ring 200 and, in particular, a part of securing means 700 may engage into a groove in slide ring 200. Securing means 700 may, for example, be glued to slide ring 200.

The spacing jig may comprise, for example, a shim. The shim is positioned between slide ring 200 and second groove ring 320 during the arrangement of the shim in order to determine the width of sealing gaps 410, 420. The shim may, for example, have a thickness between 1 μm and 100 μm, in particular between 2 μm and 50 μm, preferably between 5 μm and 30 μm. As already described above, the thickness of the sealing gap may thus be determined and adjusted in a targeted way.

The methods may additionally comprise arranging a sealing ring 500 in a groove, in particular as shown in FIG. 1 through FIG. 3, of end wall 600 and subsequently combining of sealing bush 100 (comprising groove rings 310, 320, slide ring 200, and optional securing means 700) and end wall 600 (comprising sealing ring 500), such that sealing ring 500 is arranged between slide ring 200 and end wall 600 and forms a second seal.

The invention additionally comprises a turbocharger for an internal combustion engine with a sealing unit 10 according to any one of the previously described configurations.

Although the present invention has been described above and is defined in the attached claims, it should be understood that the invention may also be alternatively defined according to the following embodiments:

1. A sealing unit (10) for a turbocharger for sealing a transition from a bearing housing into a compressor housing, comprising
   a sealing bush (100),
      wherein the sealing bush (100) is designed for common rotation
      with a shaft of the turbocharger;
   a slide ring (200);
   first and second groove rings (310, 320),
      wherein the two groove rings (310, 320) are designed for common rotation with the sealing bush (100) and are arranged on the sealing bush (100);
   characterized in that the slide ring (200) is arranged between the two groove rings (310, 320) in the axial direction such that radially extending air gaps (410, 420) are formed on both sides of the slide ring (200) between the slide ring (200) and the respective groove ring (310, 320).
2. The sealing unit according to Embodiment 1, characterized in that an outer diameter ($D_A$) of the sealing bush (100) in the area of the slide ring (200) is smaller than an inner diameter ($D_1$) of the slide ring (200) such that a gap is formed between the sealing bush (100) and the slide ring (200).
3. The sealing unit according to Embodiment 1 or Embodiment 2, characterized in that recesses are provided in the radial side walls of the groove rings (310, 320) that face the slide ring (200), in particular wherein the recesses act in a gas-transporting way, by which means a gas cushion is formed in the sealing gaps (410, 420) during operation of the turbocharger.
4. The sealing unit according to any one of the preceding embodiments, characterized in that recesses are provided in the radial side walls of the slide ring (200), in particular wherein the recesses act in a gas-transporting way, by which means a gas cushion is formed in the sealing gaps (410, 420) during operation of the turbocharger.
5. The sealing unit according to any one of the preceding embodiments, characterized in that the first and second groove rings (310, 320) are each a separate component, in particular wherein the two groove rings (310, 320) are designed to be shrunken onto the sealing bush (100) or are glued or welded to the sealing bush (100).
6. The sealing unit according to any one of the Embodiments 1 through 4, characterized in that the first groove ring (310) is designed integrally with the sealing bush (100) and the second groove ring (320) is a separate component, in particular wherein the second groove ring (320) is designed to be shrunken onto the sealing bush (100) or is glued or welded to the sealing bush (100).
7. The sealing unit according to any one of the preceding embodiments, characterized in that a sealing ring (500) is additionally provided, wherein sealing ring (500) is arranged radially outside of the slide ring (200) and surrounds the same, in particular wherein the sealing ring (500) is designed to form a second seal between the sealing unit (10) and an end wall (600) for a bearing housing of the turbocharger.
8. The sealing unit according to Embodiment 7, characterized in that the sealing ring has an X-shaped cross section.
9. The sealing unit according to any one of the preceding embodiments, characterized in that at least one securing means (700) is additionally provided, wherein the securing means (700) are designed to prevent the slide ring from twisting, in particular wherein the securing means (700) are arranged annularly around the slide ring or along a periphery of the slide ring (200).

10. The sealing unit according to Embodiment 9, characterized in that the securing means (700) are positively, non-positively, or integrally connected on the radially inner side to the slide ring (200) and designed in order to be positively, non-positively, or integrally connected on the radially outward side to an end wall (600).

11. The sealing unit according to Embodiment 9 or Embodiment 10, characterized in that the securing means (700) engage radially inwardly into a groove in the slide ring (200) and are designed to connect radially outwardly to an end wall (600) in a rotationally fixed way.

12. The sealing unit according to Embodiment 9 or Embodiment 10, characterized in that the securing means (700) are configured with an L-shaped cross section and an axially extending leg is arranged between the slide ring (200) and the sealing ring (500).

13. The sealing unit according to Embodiment 12, characterized in that the slide ring (200) is glued to the securing means (700) to prevent twisting.

14. The sealing unit according to Embodiment 13, characterized in that a groove is provided in the slide ring (200) on the radially outer periphery, in particular wherein the groove functions to accommodate an adhesive for gluing the slide ring (200) to the securing means (700).

15. The sealing unit according to any one of the preceding embodiments, characterized in that the radial side walls of the slide ring (200) are lapped, flat honed, or fine plane ground and/or that the radial side walls of the groove rings (310, 320) that face the slide ring (200) are lapped, flat honed, or fine plane ground.

16. The sealing unit according to any one of the preceding embodiments, characterized in that the groove rings (310, 320) have a chamfer on the radial outer end which functions to facilitate assembly.

17. The sealing unit according to any one of the preceding embodiments, characterized in that the sealing gaps (410, 420) have a length in the radial direction in the range from 0.1 mm to 15 mm, in particular from 0.5 mm to 10 mm, preferably from 1 mm to 5 mm.

18. The sealing unit according to any one of the preceding embodiments, characterized in that the sealing gaps (410, 420) have a gap width in the range from 1 μm to 30 μm, in particular from 2 μm to 20 μm, preferably from 5 μm through 10 μm during operation.

19. The sealing unit according to any one of the preceding embodiments, characterized in that the sealing gaps (410, 420) or the clearance for the slide ring (200) between the groove rings (310, 320) is adjustable during the assembly process.

20. A turbocharger for an internal combustion engine comprising a sealing unit (10) according to any one of Embodiments 1 through 19.

21. A method for producing a sealing unit (10) for a turbocharger comprising the following steps:
providing a sealing bush (100);
providing a first and a second groove ring (310, 320);
arranging the first groove ring (310) on the sealing bush (100);
arranging the slide ring (200) contacting on the first groove ring (310);
arranging a spacing jig to adjust the sealing gap between the slide ring (200) and the groove rings (310, 320);
arranging the second groove ring (320);
removing the spacing jig.

22. A method for producing a sealing unit (10) for a turbocharger comprising the following steps:
providing a sealing bush (100) with an integral first groove ring (310);
providing a second groove ring (320);
arranging the slide ring (200) contacting on the first groove ring (310);
arranging a spacing jig to adjust the sealing gap between the slide ring (200) and the groove rings (310, 320);
arranging the second groove ring (320);
removing the spacing jig.

23. The method according to Embodiment 21 or Embodiment 22, wherein the first (310) and the second groove ring (320) or only the second groove ring (320) is shrunken onto the sealing bush (100) or is glued or welded to the sealing bush (100).

24. The method according to any one of Embodiments 21 through 23, additionally comprising lapping, flat honing, or fine plane grinding of the radial side walls of the slide ring (200).

25. The method according to any one of Embodiments 21 through 24, additionally comprising lapping, flat honing, or fine plane grinding of the radial side walls of the first and/or the second groove rings (310, 320) that face the slide ring (200).

26. The method according to any one of Embodiments 21 through 25, additionally comprising shaping of recesses in the radial side walls of the first and second groove rings (310, 320) that face slide ring (200), and/or shaping of recesses in the radial side walls of slide ring (200).

27. The method according to any one of Embodiments 21 through 26, additionally comprising arranging of at least one securing means (700) around the slide ring (200) to prevent the slide ring (200) from twisting.

28. The method according to Embodiment 27, wherein the securing means (700) are positively, non-positively, or integrally connected to the slide ring (200), in particular wherein a part of the securing means (700) engages into a groove in the slide ring (200).

29. The method according to Embodiment 27 or Embodiment 28, additionally comprising gluing of the securing means (700) to the slide ring (200).

30. The method according to one of Embodiments 21 through 29, wherein the spacing jig comprises a shim, wherein the shim is arranged between the slide ring (200) and the second groove ring (320).

31. The method according to Embodiment 30, wherein the shim has a thickness between 1 μm and 100 μm, in particular between 2 μm and 50 μm, preferably between 5 μm and 30 μm.

32. The method according to one of Embodiments 21 through 31, additionally comprising arranging a sealing ring (500), in particular in a groove of an end wall (600), and combining the sealing bush (100), comprising the groove rings (310), 320), the slide ring (200), and the optional securing means (700), and the end wall (600), comprising the sealing ring (500), such that the sealing ring (500) is arranged between the slide ring (200) and the end wall (600) and forms a second seal.

The invention claimed is:

1. A sealing unit (10) for a turbocharger for sealing a transition from a bearing housing into a compressor housing, comprising
    a sealing bush (100) designed for common rotation with a shaft of the turbocharger;
    a slide ring (200); and
    first and second groove rings (310, 320),
    wherein the first and second groove rings (310, 320) are designed for common rotation with the sealing bush (100) and are arranged on the sealing bush (100), and
    wherein the slide ring (200) is arranged between the first and second groove rings (310, 320) in the axial direction such that radially extending air gaps (410, 420) are formed on both sides of the slide ring (200) between the slide ring (200) and the respective groove ring (310, 320).

2. The sealing unit according to claim 1, wherein recesses are provided in the radial side walls of groove rings (310, 320) that face the slide ring (200), by which means a gas cushion is foiined in the sealing gaps (410, 420) during operation of the turbocharger; and/or recesses are provided in the radial side walls of the slide ring (200), so that a gas cushion is formed in the sealing gaps (410, 420) during operation of the turbocharger.

3. The sealing unit according to claim 2, wherein the recesses act in a gas-transporting way.

4. The sealing unit according to claim 1, wherein the first and second groove rings (310, 320) are each a separate component, or that the first groove ring (310) is designed integrally with the sealing bush (100) and the second groove ring (320) is a separate component.

5. The sealing unit according claim 1, wherein a sealing ring (500) is additionally provided, wherein the sealing ring (500) is arranged radially outside of the slide ring (200) and surrounds the same.

6. The sealing unit according to claim 1, wherein at least one securing means (700) is additionally provided, wherein the securing means (700) are designed to prevent the slide ring from twisting.

7. The sealing unit according to claim 1, wherein the sealing gaps (410, 420) have a length in the radial direction in the range from 0.1 mm to 15 mm.

8. The sealing unit according to claim 1, wherein the sealing gaps (410, 420) have a gap width in the range from 1 μm to 30 μm during operation.

9. The sealing unit according to claim 1 wherein the groove ring(s) (310, 320) are designed to be shrunken onto the sealing bush (100) or are glued or welded to the sealing bush (100).

10. The sealing unit according to claim 1, wherein a sealing ring (500) is additionally provided, wherein the sealing ring (500) is arranged radially outside of the slide ring (200) and surrounds the same, and wherein the sealing ring (500) is designed to form a second seal between the sealing unit (10) and an end wall (600) for a bearing housing of the turbocharger.

11. The sealing unit according to claim 1, wherein at least one securing means (700) is additionally provided, wherein the securing means (700) are designed to prevent the slide ring from twisting, and wherein the securing means (700) are arranged annularly around the slide ring (200) or along a periphery of the slide ring (200).

12. The sealing unit according to claim 1, wherein the sealing gaps (410, 420) have a length in the radial direction in the range from 0.5 mm to 10 mm.

13. A turbocharger for an internal combustion engine comprising a sealing unit (10) according to claim 1.

14. A method for producing a sealing unit (10) for a turbocharger comprising the following steps:
    providing a sealing bush (100);
    providing a first and a second groove ring (310, 320);
    arranging the first groove ring (310) on the sealing bush (100);
    arranging the slide ring (200) contacting on the first groove ring (310);
    arranging a spacing jig to adjust the sealing gap between the slide ring (200) and the groove rings (310, 320);
    arranging the second groove ring (320);
    removing the spacing jig.

15. The method according to claim 14, wherein the first (310) and the second groove ring (320) or only the second groove ring (320) is shrunken onto the sealing bush (100) or is glued or welded to the sealing bush (100).

16. The method according to claim 14, additionally comprising shaping of recesses in the radial side walls of the first and second groove rings (310, 320) that face slide ring (200), and/or shaping of recesses in the radial side walls of slide ring (200).

17. The method according to claim 14, additionally comprising arranging at least one securing means (700) around the slide ring (200) or along a periphery of the slide ring (200) to prevent the slide ring (200) from twisting.

18. The method according to claim 14, wherein the spacing jig comprises a shim, wherein the shim is arranged between the slide ring (200) and the second groove ring (320), wherein the shim has a thickness between 1 μm and 100 μm.

19. The method according to claim 14, additionally comprising arranging a sealing ring (500), and combining the sealing bush (100), comprising the groove rings (310), 320), the slide ring (200), and the optional securing means (700), and the end wall (600), comprising the sealing ring (500), such that the sealing ring (500) is arranged between the slide ring (200) and the end wall (600) and forms a second seal.

20. A method for producing a sealing unit (10) for a turbocharger comprising the following steps:
    providing a sealing bush (100) with an integral first groove ring (310);
    providing a second groove ring (320);
    arranging the slide ring (200) contacting on the first groove ring (310);
    arranging a spacing jig to adjust the sealing gap between the slide ring (200) and the groove rings (310, 320);
    arranging the second groove ring (320);
    removing the spacing jig.

* * * * *